(12) United States Patent
Pratt et al.

(10) Patent No.: US 7,593,688 B2
(45) Date of Patent: Sep. 22, 2009

(54) DELAY BASED SPACE AND TIME COORDINATED REPEATER SYSTEM

(75) Inventors: Gill Pratt, Lexington, MA (US); David Reed, Needhom, MA (US)

(73) Assignee: Subscriber Solutions, Inc., Framingham, MA (US)

( * ) Notice: Subject to any disclaimer, the term of this patent is extended or adjusted under 35 U.S.C. 154(b) by 219 days.

(21) Appl. No.: 10/734,601

(22) Filed: Dec. 12, 2003

(65) Prior Publication Data
US 2005/0130588 A1 Jun. 16, 2005

(51) Int. Cl.
*H04B 3/36* (2006.01)

(52) U.S. Cl. .......................................... 455/7; 455/101
(58) Field of Classification Search ............... 455/7, 455/11.1, 13.1, 16, 17, 23, 18, 13.3, 428, 455/445; 370/79, 293, 315, 492, 501, 342, 370/334, 267, 347
See application file for complete search history.

(56) References Cited

U.S. PATENT DOCUMENTS

| | | | |
|---|---|---|---|
| 5,129,096 A * | 7/1992 | Burns ........................... 455/18 |
| 5,233,626 A * | 8/1993 | Ames ........................... 375/148 |
| 6,347,216 B1 * | 2/2002 | Marko et al. ................ 455/12.1 |
| 6,507,741 B1 * | 1/2003 | Bassirat ....................... 455/440 |
| 7,043,273 B2 * | 5/2006 | Sarresh et al. ............ 455/562.1 |
| 2004/0092235 A1 * | 5/2004 | Li et al. ....................... 455/101 |
| 2004/0157551 A1 * | 8/2004 | Gainey et al. ............... 455/11.1 |
| 2004/0166802 A1 * | 8/2004 | McKay et al. ................. 455/15 |
| 2004/0203542 A1 * | 10/2004 | Seo et al. ..................... 455/126 |

* cited by examiner

*Primary Examiner*—Tu X Nguyen
(74) *Attorney, Agent, or Firm*—Lee D. Weinstein

(57) ABSTRACT

A method and apparatus are provided for dynamically routing a plurality of simultaneous point-to-point communications through an array of repeating transceivers. Each repeating transceiver may simultaneously act as each of a transmitter of origin for one communication, a final receiver for a second communication, and a repeater for a plurality of other communications. When acting as a repeater, each transceiver applies programmed delays to information before re-transmitting, and these delays are programmed so as to route a communication through the array of transceivers along a designed path along which multiple re-transmissions from local repeating transceivers are received, aligned in time for constructive reinforcement, and retransmitted after dynamically programmable time delays.

18 Claims, 11 Drawing Sheets

DELAY BASED SPACE AND TIME COORDINATED REPEATER SYSTEM

FIELD OF THE INVENTION

The field of the invention relates to Radio communications, and more particularly to synthetic aperture antenna systems and tapped-delay-line signal enhancement techniques. More specifically, the invention relates to a method and apparatus for utilizing a dynamically configured array of repeaters to facilitate multiple point-to-point communication links.

BACKGROUND OF THE INVENTION

Ever since radio transmission first became a reality, utilization of the electromagnetic (EM) spectrum for communication has continued to grow. Every part of the electromagnetic spectrum from AM radio up through infrared and visible light is now used to transmit information. Modern consumer devices which transmit and/or receive EM signals include FM and AM radios, CB and personal radios, televisions, pagers, cell phones, remote controls for consumer electronics, GPS receivers, PDAs, cordless phones, wireless local area networks, wireless computer peripherals, garage door openers, wireless door bells, wireless home and car burglar alarm components, etc. New low-power EM communication standards such as Bluetooth are resulting in a new generation of consumer electronics such as video cameras, VCRs and the like which can all communicate wirelessly.

In an attempt to minimize interference between wireless devices, while having as many devices make use of the available EM spectrum as possible, countries such as the United States have enacted complex laws and regulations specifying the types of use for different portions of the EM spectrum (including geographic and power limitations), and in some cases requiring licensing of classes of transmitters or individual transmitters.

Various technologies have been developed over time to allow different parts of the EM spectrum to be utilized by more devices simultaneously. While early applications of EM communication (such as radio and television broadcasts) assumed by default that the transmitter would be omnidirectional (so it could reach listeners in every direction) and the receiver would be omnidirectional (so it would be cheap and simple to use), and that the transmission of information from the originating transmitter to the final receiver would take place in one step, setups like that severely limit the use of the EM spectrum as compared with what is possible when other techniques (such as directional antennas and/or repeaters) are employed.

Many of the challenges that exist in the efficient utilization of the EM spectrum (both across frequency and across geographic space) have analogs in acoustics. Many people trying to talk to each other in a restaurant at the same time produces an environment with significant background noise. People at first try to compensate by talking louder. With everyone talking louder, the background noise gets even louder. Finally, people have to lean closer to each other to talk. In the end, people are leaning closer as well as shouting, whereas if everyone had been leaning closer to begin with, the shouting would not have been necessary. Perhaps one reason governments regulate EM transmission power is to avoid the same "escalation" in the EM domain, and drive technology toward more efficient solutions for point-to-point communication.

The shape of the human head and the placement of the ears allow a person to listen directionally and pick out one of many nearby conversations. Analogously, the utilization of directional receivers and/or transmitters has allowed better utilization of the EM spectrum. For example, a modern cell phone tower can broadcast to several cell phones simultaneously on the same channel, in different physical directions, and the direction of each communication can be varied over time as the people using cell phones move around (typically on foot or in cars). Likewise, satellite receivers may be pointed individually at any one of a number of orbiting satellites operating in the same frequency band.

In the cell phone application, the transmit and receive patterns of the cell phone tower antenna are highly directional and varied under computer control, while the transmit and receive patterns of the consumer's cell phone are omnidirectional (so the consumer doesn't have to know where the tower is or point the cell phone at the tower). The directionality of the cell tower antenna not only allows the tower to communicate with more cell phones simultaneously in a given portion of the EM spectrum, it also allows the transmitters in the cell phones to operate at lower power, because the directionality results in an increase in received signal-to-noise ratio when the cell tower antenna is operating as a receiver. This increase in signal-to-noise ratio is sometimes referred to as antenna "gain". In transmit mode, because the directionality of the antenna concentrates the transmitted RF power in a particular direction, the signal intensity in that direction is effectively amplified. In receive mode, although directionality does not result in an increase in received signal, it is effectively a gain (in signal-to-noise ratio) because the antenna directionality results in a reduction in noise.

As the EM spectrum becomes more heavily utilized, more and more EM "noise" is present in our environment. Any EM signals that come from transmitters other than the one we are trying to receive from shall in this document be referred to as noise. In addition to noise, in an urban environment, for example, where metallic objects may reflect EM transmissions, the problem of "multi-path" must also be dealt with. Multi-path occurs when two versions of the same signal arrive at a receiver through pathways of different lengths. If the difference in lengths of the two paths is short compared to the EM wavelength of the highest frequency information which is modulated onto the carrier, but long enough to represent at least a significant fraction of the wavelength of the carrier itself, then multi-path can result in destructive interference at the carrier level. The probability density function in FIG. 9 illustrates the relative likelihoods that two waves arriving at an antenna with equal field strength and randomly aligned phase would sum to a composite field strength between zero and two. If one of the two pathways involves reflection of the EM signal off a moving object, loss of signal (caused by destructive interference) may come and go over time.

If the difference in lengths of the two paths is long compared to the EM wavelength of the highest frequency information which is modulated onto the carrier (such condition shall herein be referred to as Long Multi-path), ghosting of the demodulated signal will occur, such that the actual demodulated signal comprises two time-shifted versions of the intended demodulated signal (where the two time-shifted components usually also have different amplitudes). The effect of such multi-path is commonly observable as "ghost" image artifacts in broadcast TV images received in urban environments.

Making the receiving antenna highly directional significantly reduces most sources of multi-path, since in most cases the EM signals that arrive at the receiving antenna do not wind up coming from the same direction. Directional receiving antennas can be a practical solution to improving broadcast TV reception (witness the availability of roof-top TV antennas and associated servo-mechanisms to rotate such antennas under remote control), but as illustrated in the cell phone example, directional receiving antennas may not be a practical solution in an application where either the transmitter or the receiver is mobile.

Different technologies have been developed to deal with Long Multi-path in the signals received on the omnidirectional antennas of cell phones and TV sets. One technique used in some TV sets involves subtracting an amplitude-adjusted version of demodulated signal from the demodulated signal, such that the ghost phenomenon is eliminated to first order. This is done by passing the composite received signal through a Finite Impulse Response (FIR) filter with dynamically adjustable coefficients.

Another technique (used in cell phones) involves shifting the received RF signal down to an intermediate frequency (IF), and then sampling the IF and using a multi-tapped FIR filter (sometimes referred to as a "rake filter") to effectively constructively align the arrival times of the various multi-path signals. This is usually done as part of the overall Digital Signal Processing (DSP) performed in the cell phone. Self-adjusting DSP algorithms have been developed whereby cell phones monitor and dynamically compensate out the effects of Long Multi-path interference.

It has already been mentioned that highly directional antennas comprise one method for reducing the amount of power needed to transmit over a given distance from a transmitter to an intended receiver (thus reducing EM "pollution" or noise at unintended receivers). Another method of reducing the required amount of transmit power is to utilize repeaters. In the acoustic analog of the crowded restaurant with many conversations going on, one might think of two ways of communicating with a person on the other side of the room. One way would be to stand up and yell, and another way would be to ask a series of people to pass a verbal message along until the message reaches the intended recipient.

The power needed to produce a given field strength at a given distance in the far field of an omnidirectional transmitter grows with the square of the distance. Thus, dividing the distance the signal is to be transmitted into co-linear sequential segments reduces not only the power required at each sequential (repeater) transmitter, but also reduces the summed total power of the sequence of transmitters. That is, the summed total power of the sequence of transmitters is less than the power needed to transmit the signal the entire distance using a single transmitter. Repeaters have long been used to reduce the power needed to transmit communications signals from remote areas. Repeaters can also be used to transmit "around" obstructions. For instance, a series of repeaters can be used to transmit a line-of-sight EM signal over or around a mountain.

A series of repeaters may be considered to be a multiple-discreet-element wave guide arranged in space. The series of repeaters guides a signal along a path in a way analogous to a wire or a fiber-optic cable guiding an EM signal along a path, by concentrating the propagation of that signal in a volume of space along the path, rather than having the signal propagate equally in all directions. In a military application, it may be desirable to use a series of repeaters to route a transmitted signal around an enemy, such that at the location of the enemy, the transmitted signal is too weak to receive.

While utilization of dedicated repeaters certainly aids in efficient point-to-point transmission of EM signals, this solution is not without its own drawbacks. Such drawbacks include the cost incurred to manufacture, geographically locate, and maintain an entire series of transceivers, rather than just two. In a cell-phone-to-cell-phone conversation, cell phone towers essentially act as ground-linked repeaters for passing along information transmitted from one cell phone to another. Thus while the cost in terms of total EM transmit power is lower, the cost in terms of producing and maintaining equipment may be high.

Most cell phone users are familiar with certain geographic areas where cell phone coverage "drops out". Usually at times of highest system utilizations (such as morning and evening commuting times), the drop-out zones become larger and more frequent.

Indeed, in both civilian and military applications, it is often true that the times when more ground-based repeaters and more ground-based-repeater capacity is most needed are at times of highest system utilization. In disaster situations the need for more capacity becomes particularly acute. These situations include "acts of god" such as earthquakes or fires in places such as California, hurricanes in places such as the southeastern states, as well as situations such as the terrorist attacks of Sep. 11, 2001 during which the cellular phone system became so overloaded it was virtually useless to emergency personnel.

In view of the foregoing, a need clearly exists for self-configuring communications systems that utilize their own dynamically shifting matrix of receive and transmit nodes to route wireless communication signals in areas where no ground stations have been set up. This need exists both for military applications and for civilian applications. Such a military communication system should utilize the entire array of transceivers carried by military personally in a combat operation as nodes on a dynamically configurable repeater system. Such a civilian communication system is needed, for instance, to automatically fill in "holes" in cellular coverage (where tower antennas provide inadequate coverage) by routing calls through other cell phones (which are equipped with the present invention).

SUMMARY OF THE INVENTION

The present invention utilizes an array of personal communication devices such that each device is not only an end point for a given point-to-point communication, but also a repeater for a plurality of other point-to-point communications. Each point-to-point communication may take multiple simultaneous paths. FIG. 5 illustrates a matrix of transceivers 500, and the multiple paths taken through that matrix by communication from transceiver 501 to transceiver 502 (through repeater set 507), and from transceiver 503 (through repeater set 506) to transceiver 504. Within FIG. 5, all the arrows coming in to any node represent RF signals from nearby repeaters. In a preferred embodiment, digital signal processing of multiple delayed versions of signals received at each receiver is employed to enhance signal-to-noise ratio by constructively correlating signals propagating along multiple paths through the array of repeaters. Although the two propagation paths shown in FIG. 5 do not cross, the present invention allows them to cross (utilize common nodes) should that be desired.

In the preferred embodiment, both data (the information being communicated between users) and control signals propagate through the repeater array. Control signals may take different paths through the repeater array than the data, since the routing of the data both control and data information may be separately controlled. Preferably, each repeater contains digital means to provide a separately controllable delay to each signal that it re-transmits (or repeats). These controllable delays are separately and dynamically reconfigurable.

The repeaters in the array are not dedicated repeaters, but rather serve both a repeater function as well as their intended end-point communication function (such as being a cell phone). Although transceivers in the array depicted in FIG. 5 are regularly spaced, regular spacing is not a requirement according to the present invention, and in fact it is recognized that in many applications each transceiver in the array would be mobile, and in motion during use. Since each device may be and often will be mobile, its position will not be known well enough to allow dynamically adjustable delays to provide multi-path communication which provides constructive signal correlation at the carrier level (such as that provided by a directional antenna), rather the present invention provides correlation between multiple communication paths which provide constructive reinforcement of the signals being transmitted on the carriers. In the preferred embodiment of the present invention, constructive summation of multi-path communication is performed at an intermediate frequency (IF) through summing multiple outputs of a tapped digital delay line as illustrated in FIG. 7.

In an alternate embodiment, constructive summation and/or correlation of multi-path communication may be performed after demodulation (detection). Optionally, re-coding may be employed prior to re-transmission of repeated signals. In the preferred embodiment, all sampling and delaying of signals occurs before any detection process which might ultimately be used to bring the wirelessly transmitted information to baseband. Heterodyning (mixing) is a nonlinear operation, it preserves the linearity of the signal, whereas techniques used to ultimately demodulate a signal to baseband usually result in distortion which one would not want compounded along a chain of repeaters.

It is therefore an object of the present invention to provide a novel method of utilizing a dynamically configurable array of repeaters to facilitate multiple point-to-point communication links. It is a further object of the present invention to facilitate a mobile network who's capacity to handle calls grows automatically with the number of users in the system, such that overloads during high utilization times such drive time or at times of disaster do not occur. It is a further object of the present invention to provide more economical utilization of hardware resources in an array of repeaters to provide more economical multiple point-to-point communication links. It is a further object of the present invention to facilitate point-to-point communication between any two transceivers in a matrix of transceivers, with minimal or no reliance on ground (base) stations. It is a further object of the present invention to reduce the required transmitter power in an urban environment containing a plurality of mobile personal transceivers. It is a further object of the present invention to provide a novel method for enhanced-security military communication across or around select geographic areas.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTIONS OF SOME PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of the preferred embodiment (as well as some alternative embodiments) of the present invention.

Figure 1:
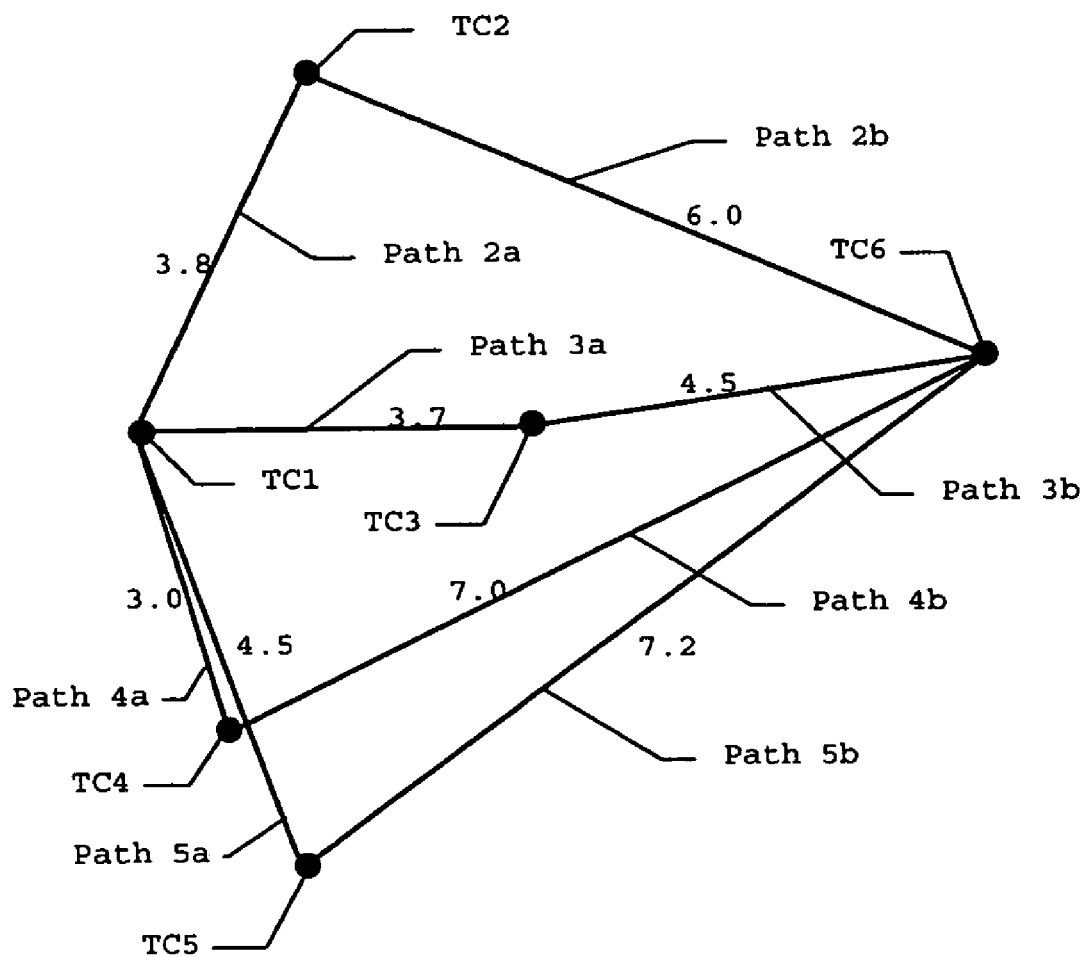
FIG. 1 depicts the spatial arrangement between 6 transceivers, the multiple paths that a signal takes through multiple repeaters (4 are shown) in traveling from transceiver 1 to transceiver 6, and the propagation delays associated with those paths.

Referring first to FIG. 1, depicted is the spatial arrangement between 6 transceivers TC1-TC6, and the multiple paths that a signal takes through multiple repeaters in traveling from transceiver TC1 to transceiver TC6 in the preferred embodiment of the present invention, and the propagation delays associated with those paths. The six transceivers shown in FIG. 1 (TC1, TC2, TC3, TC4, TC5, and TC6) according to the present invention are spatially arranged as shown. However, it is known that other arrangements are possible in accordance with the invention. Supposing that a signal is to be transmitted from TC1 to TC6 through repeater array TC2, TC3, TC4, and TC5, the signal originates at TC1 and propagates along Path 2a, Path 3a, Path 4a, and Path 5a to repeater transceivers TC2, TC3, TC4, and TC5, respectively. The lengths of Path 2a, Path 3a, Path 4a, and Path 5a shown in FIG. 1 (e.g., 3.8, 3.7, 3.0, and 4.5 normalized length units, respectively) may be thought of as being representative of some normalized distance between transceivers, or representative of normalized propagation time of the signal along each path. Similarly, the signals will be retransmitted by repeater transceivers TC2, TC3, TC4, and TC5 along Path 2b, Path 3b, Path 4b, and Path 5b, respectively, to transceiver TC6. The lengths of Path 2b, Path 3b, Path 4b, and Path 5b shown in FIG. 1 (e.g., 6.0, 4.5, 7.0, and 7.2 normalized length units, respectively), like Paths 2a-5a, may also be thought of as being representative of some normalized distance between transceivers TC2-TC5 and TC6, or representative of the normalized propagation time of the signal along each path.

Figure 2A:
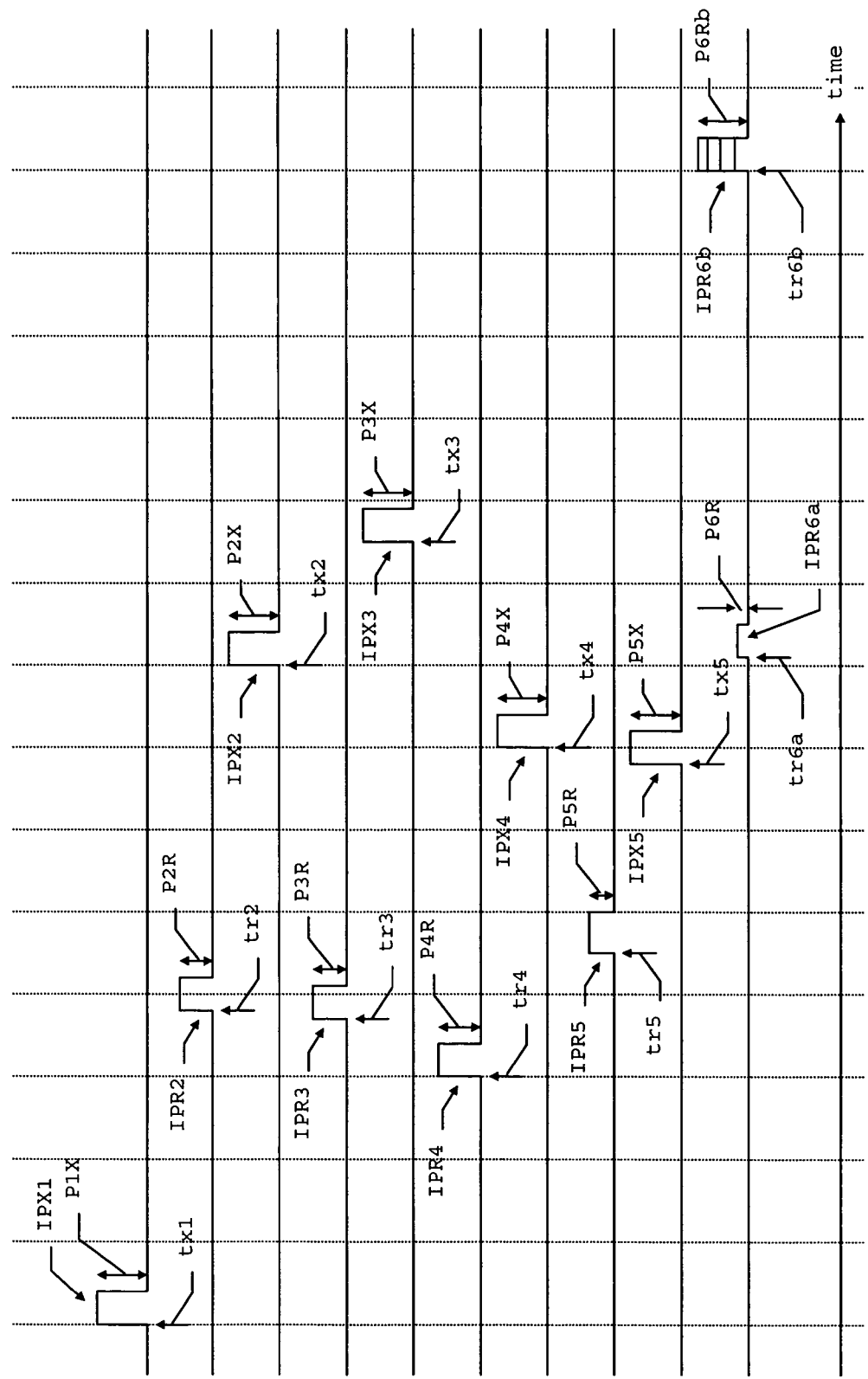
FIGS. 2A and 2B illustrate the relative timing and changes in signal-to-noise ratio between signals arriving at and being retransmitted from the transceivers in FIG. 1.
Figure 2B:
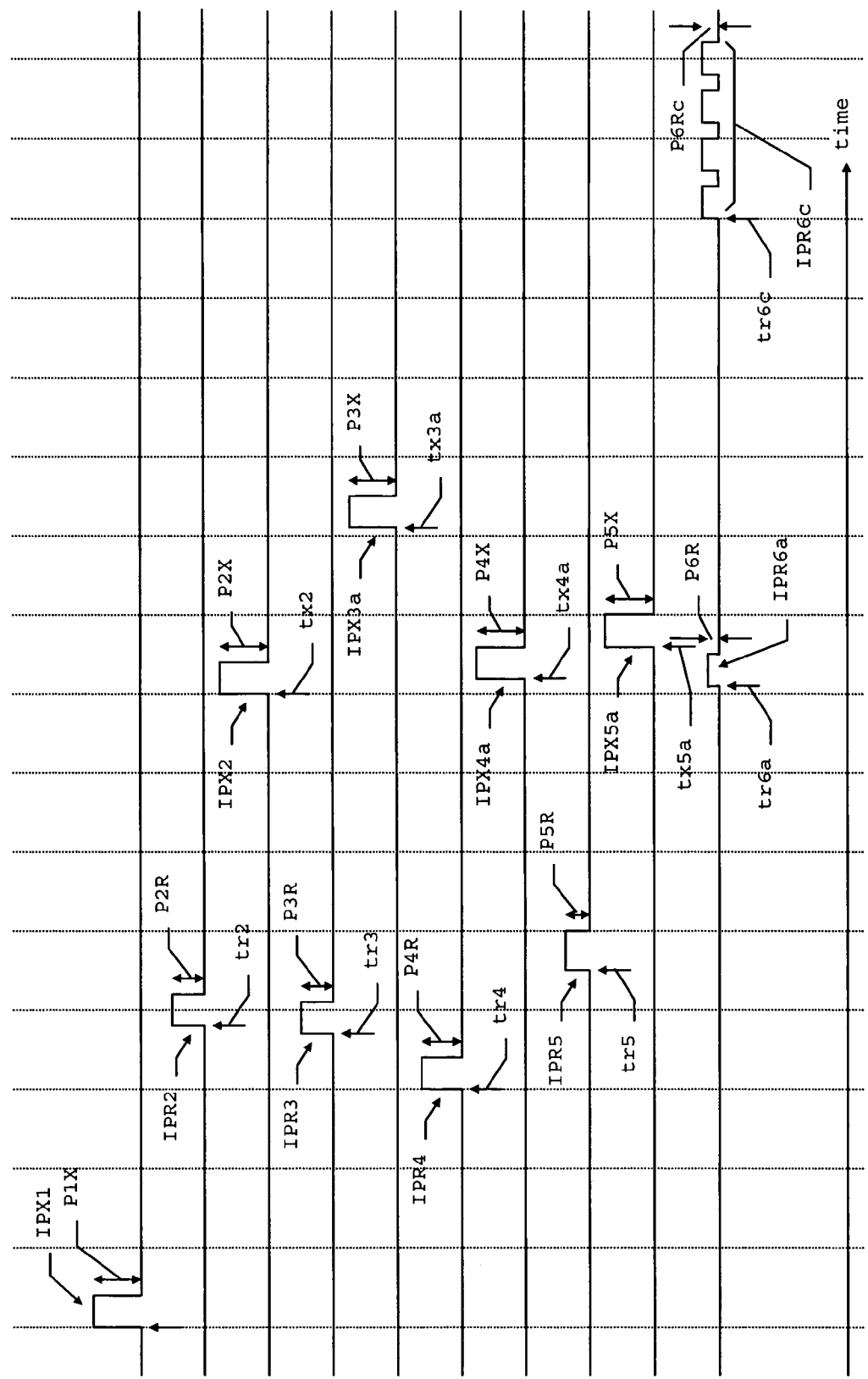

The signals received at the receivers of transceivers TC2, TC3, TC4, and TC5 are delayed, reduced-power versions of the signal transmitted from the transmitter of TC1. Since some noise power is also received at each receiver or repeater, each re-transmission results in a lowered signal-to-noise ratio in the ultimately received signal. FIGS. 2A and 2B illustrate the relative timing and changes in signal power between signals arriving at and being retransmitted from the transceivers in FIG. 1. Transceivers TC2, TC3, TC4, and TC5 have been dynamically configured to receive signals from transceiver TC1 and retransmit those signals to transceiver TC6. In a preferred embodiment of the present invention, each transceiver only needs to listen to signals from transceivers within a certain distance (or propagation time) of itself. As used herein, that distance will be referred to as that transceiver's "listen distance" (and that time will be referred to as that transceiver's "listen time"). Signals originating from transceivers positioned farther away from the destination receiver than the transceiver's listen distance are received via retransmission by intervening transceivers acting as repeaters.

Suppose transceiver TC1 transmits a pulse of information IPX1, having transmitted signal power P1X. As that transmitted information pulse propagates away from transceiver TC1, the signal power available for reception at the antenna of a receiver/repeater decreases with the distance the signal travels. As illustrated in FIGS. 2A and 2B, the IP1 pulse transmitted from transceiver TC1 at time tr2 is received by transceiver TC2 as information pulse IPR2, with reduced signal power P2R. Similarly, the IP1 pulse transmitted from transceiver TC1 at time tx1 is received by transceiver TC3 as information pulse IP3 at time tr3 with reduced signal power P3R, and received by transceiver TC4 as information pulse IP4 at time tr4 with reduced signal power P4R. If we assume that transceiver TC1 is far enough away from transceiver TC6 as to be outside the listen distance of transceiver TC6, the signal-to-noise ratio with which information pulse IPR6a is received by transceiver TC6 is too low for this signal to be directly usable, but if this information is correlated with other (repeated) pulses received at transceiver TC6, it can be used to further increase overall system performance.

In the preferred embodiment of the present invention, when an array of transceivers acts as repeaters to re-transmit a signal from an originating transceiver to a destination transceiver, each repeating transceiver applies a dynamically configured delay before re-transmission. This is done so that the repeated signals arriving at the destination receiver are aligned in a preferred way in time. FIGS. 2A and 2B display two possible sets of re-transmission delays, resulting in two possible time alignments of finally received pulses at transceiver TC6. In an embodiment where timing alignment is precise enough that pulses from different repeaters can be retransmitted in time to arrive aligned in time well enough to add constructively at the carrier level, coincident arrival alignment as shown in pulse group IPR6b may be preferred.

To create such an alignment, as shown in FIG. 2A, transceiver TC2 waits to retransmit information pulse IPX2 at time tx2 at power level P2X (typically similar to power level P1X, and at roughly the same signal-to-noise ratio as transceiver TC2 was able to receive information pulse IP2R) the information pulse it received at time tr2. Similarly, transceiver TC3 waits to retransmit information pulse IPX3 at time tx3 at power level P3X (typically similar to power level P1X, and at roughly the same signal-to-noise ratio as transceiver TC3 was able to receive information pulse IP3R) the information pulse it received at time tr3. Similarly, transceiver TC4 waits to retransmit information pulse IPX4 at time tx4 at power level P4X (typically similar to power level P1X, and at roughly the same signal-to-noise ratio as transceiver TC2 was able to receive information pulse IP4R) the information pulse it received at time tr4. Similarly, transceiver TC5 waits to retransmit information pulse IPX5 at time tx5 at power level P5X (typically similar to power level P1X, and at roughly the same signal-to-noise ratio as transceiver TC2 was able to receive information pulse IP5R) the information pulse it received at time tr5. The delay times that transceivers TC2, TC3, TC4, and TC5 allow to elapse before retransmitting the signals they received from transceiver TC1 are programmed such that the information pulses they transmit are received simultaneously at time tr6b at composite power level P6Rb. Although information pulses IPX2, IPX3, IPX4, and IPX5 are all re-transmitted at renewed power levels, the information from each will individually be received at the next repeater down the chain with a lower signal-to-noise ratio then transceivers TC2, TC3, TC4, and TC5 each received their information pulses. However, the summed correlated information pulse IPR6b received at transceiver TC6 may actually be received with a higher over-all signal-to-noise ration than any of the intermediate pulses IPR2, IPR3, IPR4, and IPR5 were received at intermediate transceivers TC2, TC3, TC4, and TC5, respectively.

In an embodiment where pulses from different repeaters cannot be retransmitted with timing accurate enough such that the retransmitted pulses arrive aligned in time to add constructively at the carrier level, but can be retransmitted with timing accurate enough that the retransmitted pulses arrive aligned in time to better than the pulse rise time associated with the information bandwidth of the channel, alignment shown in pulse set IPR6c (which arrives at transceiver TC6 starting at time tr6c, at a range of power levels P6Rc) in FIG. 2B would be preferred, as will be explained below.

Preferably, the retransmission delays are adjusted precisely enough to cause coherence in the received carrier signals carrying information pulses IP2 through IP5, and thus the carriers reinforce each other as received by TC6. Alternatively, retransmission through times tx2, tx3, tx4, and tx5 may not be precisely aligned enough to give carrier coherence to the signals IP2R through IP5R arriving at transceiver TC6, but these times are aligned precisely enough to give good coherence to the demodulated information signal in information pulses IP2R through IP5R. In the preferred embodiment, in such a case each repeater which has been dynamically configured to retransmit signals from a first transceiver to a second transceiver may be configured to retransmit on a different carrier frequency from the rest of the repeaters retransmitting signals from the transceiver TC1 to the transceiver TC6. Transceiver TC6 receives signals simultaneously on different carrier frequencies from each repeater and correlates the demodulated information streams received on the different carrier frequencies to derive an information signal with a higher signal-to-noise ratio than the signal-to-noise ratio of any of the individual retransmitted signals.

In another embodiment, information pulses IP2R through IP5R are retransmitted on the same carrier frequency, and delays through times are not precisely aligned enough to give carrier coherence when the retransmitted information pulses arrive at transceiver TC6. In this embodiment, times tx2a, tx3a, tx4a, and tx5a through are chosen so as to stagger the arrival times of the retransmitted reduced signal-to-noise-ratio information pulses at TC6 such that no information overlap occurs (as shown in pulse group IPR6c in FIG. 2B). Here, the multiple arrivals can be constructively summed through a finite-impulse-response (FIR) filter to improve signal-to-noise ratio. This FIR filter is preferably a digital FIR filter, and operates on data sampled after demodulation (detection). In another embodiment, this FIR filter operates on data sampled after down-shifting from the carrier frequency to an intermediate frequency (IF) using a mixer.

In the preferred embodiment, no matter whether all retransmitted pulses are retransmitted on the same carrier frequency or different carrier frequencies, and no matter whether pulses are re-transmitted to arrive coincident in time or spaced out in time, retransmission delays used in transceivers TC2, TC3, TC4 and TC5 are chosen such that the retransmission delay added by the repeating transceiver in the longest signal path (which in this example is the path through repeating transceiver TC5) is non-negative.

Figure 7:
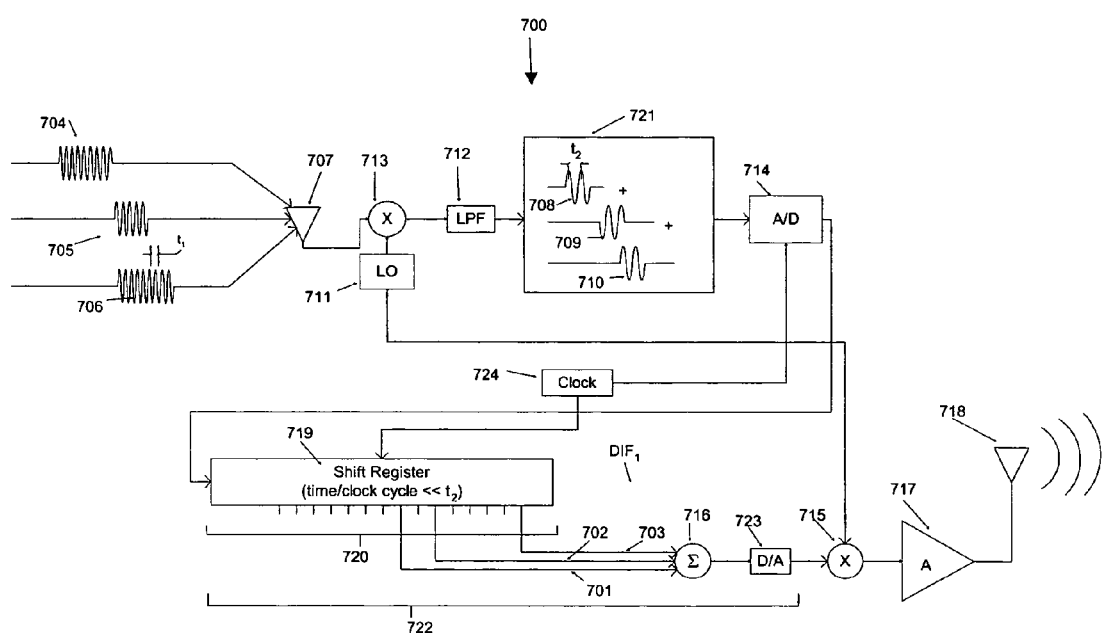
FIG. 7 depicts the receiving element, IF mixer, IF signals, A/D, tapped delay line, dynamically reconfigurable summing elements, and transmitting element within each transceiver/repeater in accordance with the preferred embodiment of the present invention where constructive summation of multi-path communication is done at an intermediate frequency (IF) through summing multiple outputs of a tapped digital delay line.

Turning now to FIG. 7, depicted is a schematic representation of transceiver/repeater 700 according to the preferred embodiment of the present invention. As shown, RF bursts of data 704, 705, and 706 are received by transceiver/repeater 700, according to the present invention, at receiving antenna 707 staggered in time and/or frequency. Preferably, the RF signal received at antenna 707 is down-shifted in frequency by being multiplied by the output of local oscillator 711 in down-shifting mixer 713, and filtered by low-pass filter 712.

Figure 6:
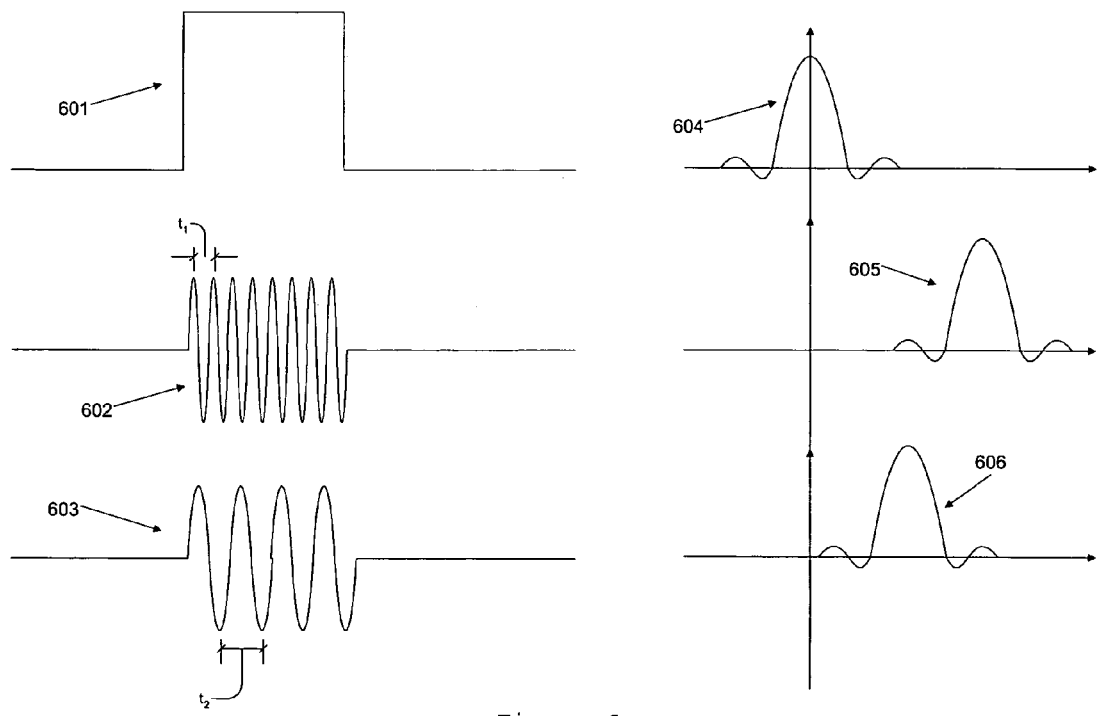
FIG. 6 depicts an information pulse, and time domain and frequency domain representations of an RF and IF carrier modulated by the information pulse in accordance with the present invention. In the preferred embodiment, such an information pulse is transmitted as a wireless signal. The term "wireless signal" may be used herein to refer either to a baseband information signal which is (or is to be, or has been) transmitted wirelessly, or to such a baseband information signal modulated in some fashion for transmission or processing.

As illustrated in FIG. 6, this operation modulates the frequency domain representation of the incoming information pulses. For example, incoming information pulse 601 may have frequency spectrum 604. When information pulse 601 is modulated onto carrier 602, the resulting modulated signal has frequency spectrum 605. When a signal such as 602 is received by antenna 707 (in FIG. 7), down-mixed in mixer 713 and filtered by low-pass filter 712, the resulting signal might be represented by waveform 603 and spectrum 606 in FIG. 6. As shown, the frequencies present in frequency spectrum 606 are in between the frequencies of the original (base band) signal of frequency spectrum 604 and the transmitted signal of frequency spectrum 605. In the preferred embodiment, these intermediate frequencies are amenable to sampling by inexpensive, readily available analog-to-digital (A/D) converters.

Figure 8:
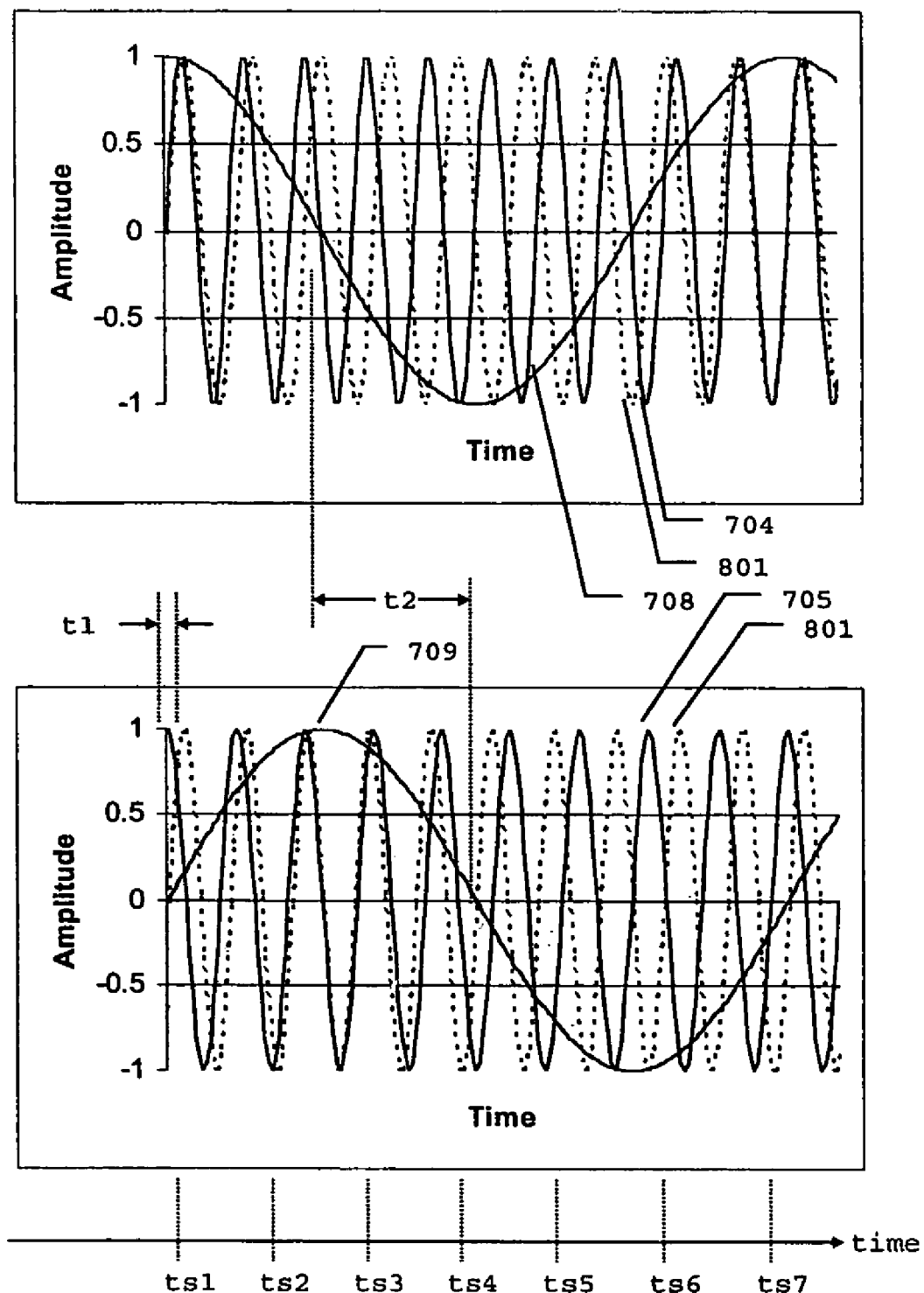
FIG. 8 depicts the frequency and phase relationships between the local oscillator signal, received information carrier, and IF signal, and how the IF phase changes as the relative phases of the carrier and local oscillator change in the preferred embodiment of the present invention.
Figure 9:
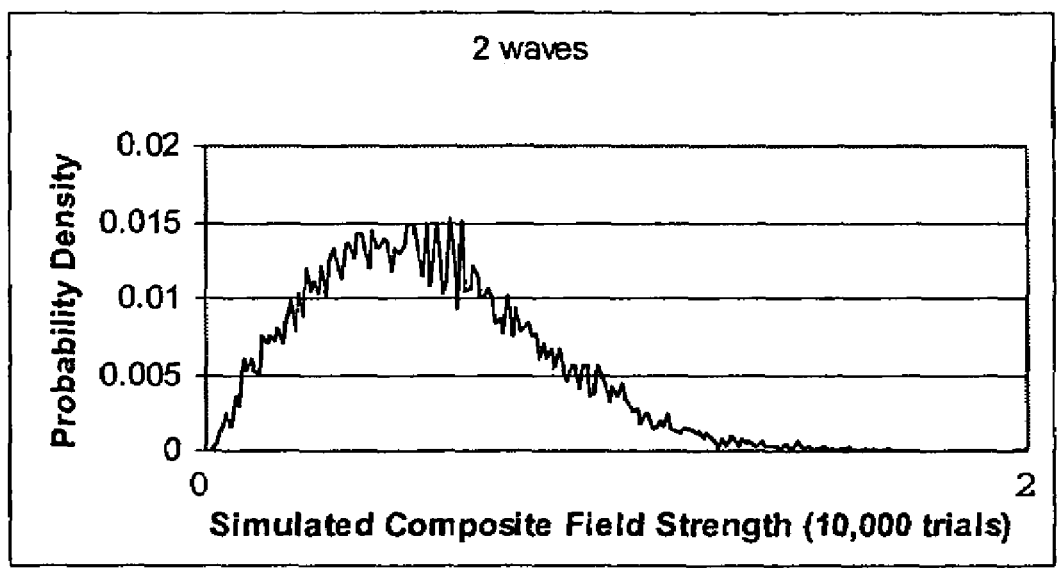
FIG. 9 depicts a probability density function (derived from computer simulations) for the range of possible summed values of a dual multi-path signal, where the amplitude of each wave is assumed to be unity and the relative phase between the waves is equally randomly distributed.

FIG. 8 depicts more precisely an example time and phase and frequency relationship between local oscillator signal 801, received carriers 704 and 705, and resulting IF signals 708 and 709 (which result from mixing local oscillator signal 801 from local oscillator 711 with received carriers 704 and 705, respectively, in mixer 713). In the example shown, the local oscillator 711 is set to nine tenths of the carrier frequency. Note how a small shift t1 in time of arrival between carriers 704 and 705 results in a roughly 10 times greater time shift in the alignment between IF signals 708 and 709. Typically a local oscillator frequency is used that is a much smaller percentage different from the carrier frequency, so the time shift magnification factor of the IF signal over the time shift (or, equivalently, phase shift) of a received carrier is even further magnified. This time magnification allows practically realizable sampling and filtering systems to digitally sample signals such as 708 and 709 and effectively actively find, track, and use the optimum time alignment for summing multiple received signals to increase effective signal-to-noise performance at the receiver. Sampling times ts1 through ts7 shown in FIG. 8 are an example of sampling times which would be quite adequate to digitally correlate, align, and filter IF signals such as 708 and 709, but inadequate to align phases of carrier signals 704 and 705.

Referring back to FIG. 7, in the time domain, the signal on IF strip 721 may be thought of as a linear combination of IF signals such as 603. In particular, as depicted in FIG. 7, the signal on IF strip 721 may be thought of as a linear combination of IF signals 708, 709, and 710, which result from signals 704, 705, and 706, respectively, received at antenna 707. For example, if the periods of waveforms 704, 705, and 706 are all t1, then the periods of waveforms 708, 709, and 710 will all be t2, where t2 is longer than t1. In such an example, in an embodiment where time delays may not be adjusted precisely enough to cause alignment to within a fraction of t1, the information pulses represented by signals 704, 705, and 706 are preferentially aligned in time as they arrive at antenna 707 such that they are non-coincident in time. As previously mentioned, should waveforms 704, 705, and 706 align in such a way as to substantially cancel each other out at antenna 707, the resultant signal on IF strip 721 will also be substantially zero, and the ability to delay and repeat the received information may be impaired.

Should the periods of carrier signals 704, 705, and 706 be different, however (as would for instance be the case if spread-spectrum techniques are used in re-transmission), they may be allowed to arrive in any time alignment desired, because since sine waves are eigenfunctions of linear systems, no cancellation will take place either at antenna 707 or on IF strip 721. Thus, by sampling IF strip 721, all of A/D 714, FIR filter 722, retransmission summer 716, digital to analog (D/A) converter 723, retransmission (up-shifting) mixer 715, retransmission amplifier 717, and retransmission antenna 718 serve an analogous function to three parallel systems where three sets of signals are received and demodulated to base band by three receivers tuned to separate frequencies, processed in three parallel FIR filters, and retransmitted on three separate antennas. This analog is true within certain limitations. For instance, if the system shown in FIG. 7 received two information pulse sets from the same set of repeaters, where the two information pulse sets are on different frequencies but are aligned in time and intended to be retransmitted to different destinations, then the system could not implement the proper delays to guide transmission of one of those pulse sets to a given destination without also guiding retransmission of the other pulse set to the same destination. This limitation may, however, be overcome if correlation techniques are used to separate different frequency components of digital IF (DIF) signal, and multiple parallel FIR filters are used.

The set of output taps 720 on shift register 719 in FIR filter 722 make possible the delays between receive and transmit time pairs tr2 & tx2, tr3 & tx3, tr4 & tx4, tr5 & tx5 discussed previously and shown in FIG. 2A, and receive and transmit time pairs tr2 & tx2$a$, tr3 & tx3$a$, tr4 & tx4$a$, tr5 & tx5$a$ discussed previously and shown in FIG. 2B. Again referring to FIGS. 2A, 2B and 7, the two example time alignments used to produce ultimately received information pulse sets IPR6$b$ and IPR6$c$ are realized by summing different output taps (such as 701, 702, and 703) of shift register 719 at summing junction 716. Clock signal 724 synchronously clocks shift register 719 and A/D converter 714.

Figure 4A:
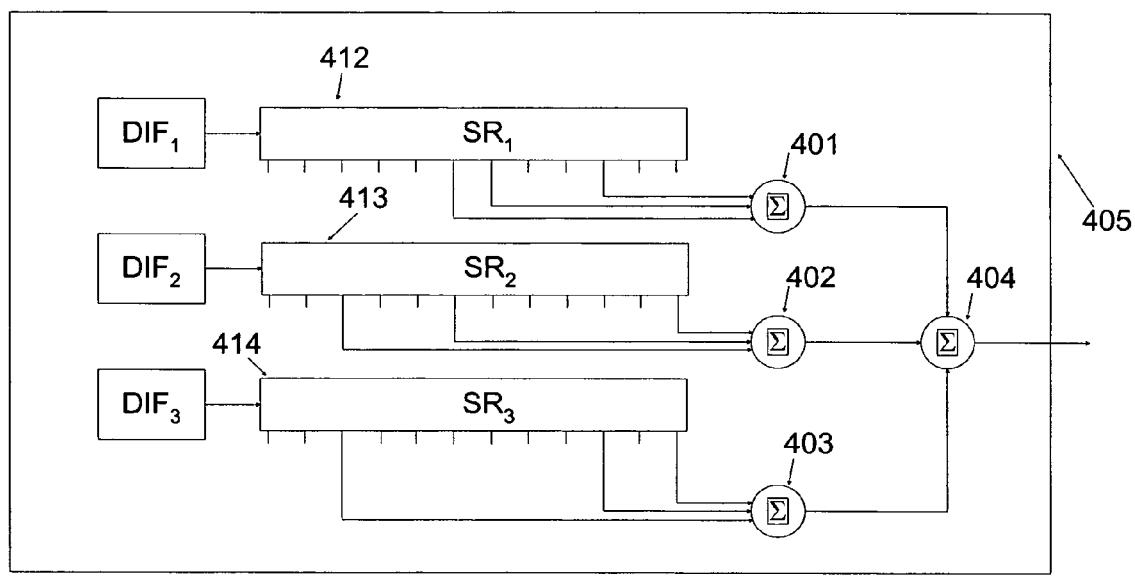
FIGS. 4A and 4B illustrate the equivalence between modulating the transmitter of a repeater with a sum of multiple signals (each derived as a multi-coefficient sum) and modulating the transmitter with a single composite multi-coefficient sum.
Figure 4B:
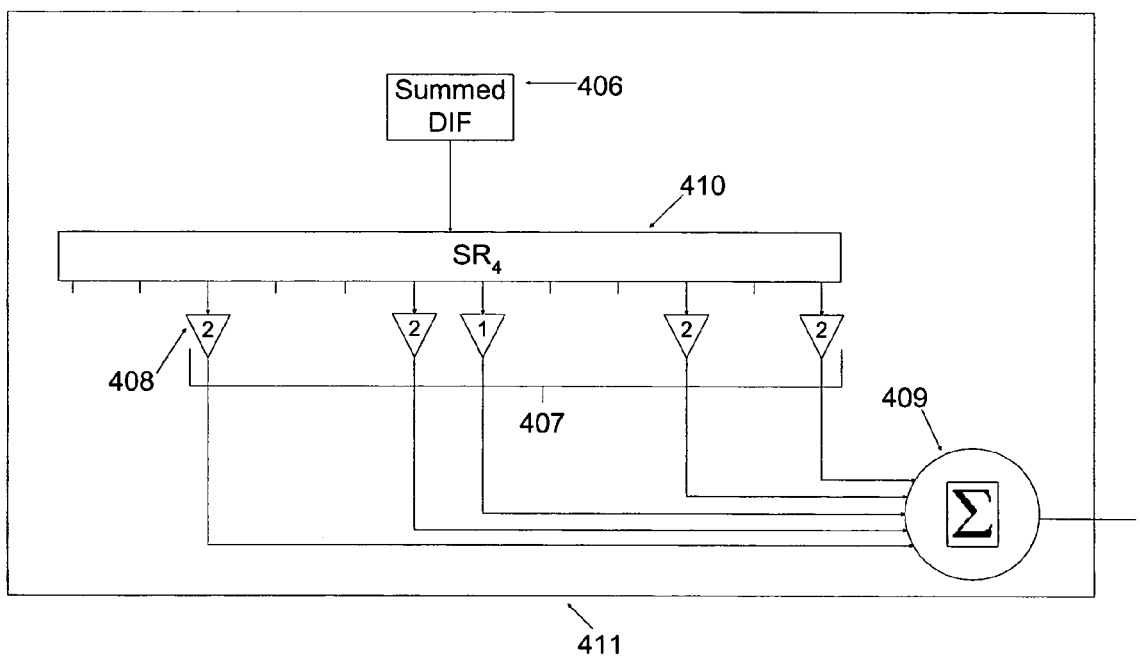
Figure 5:
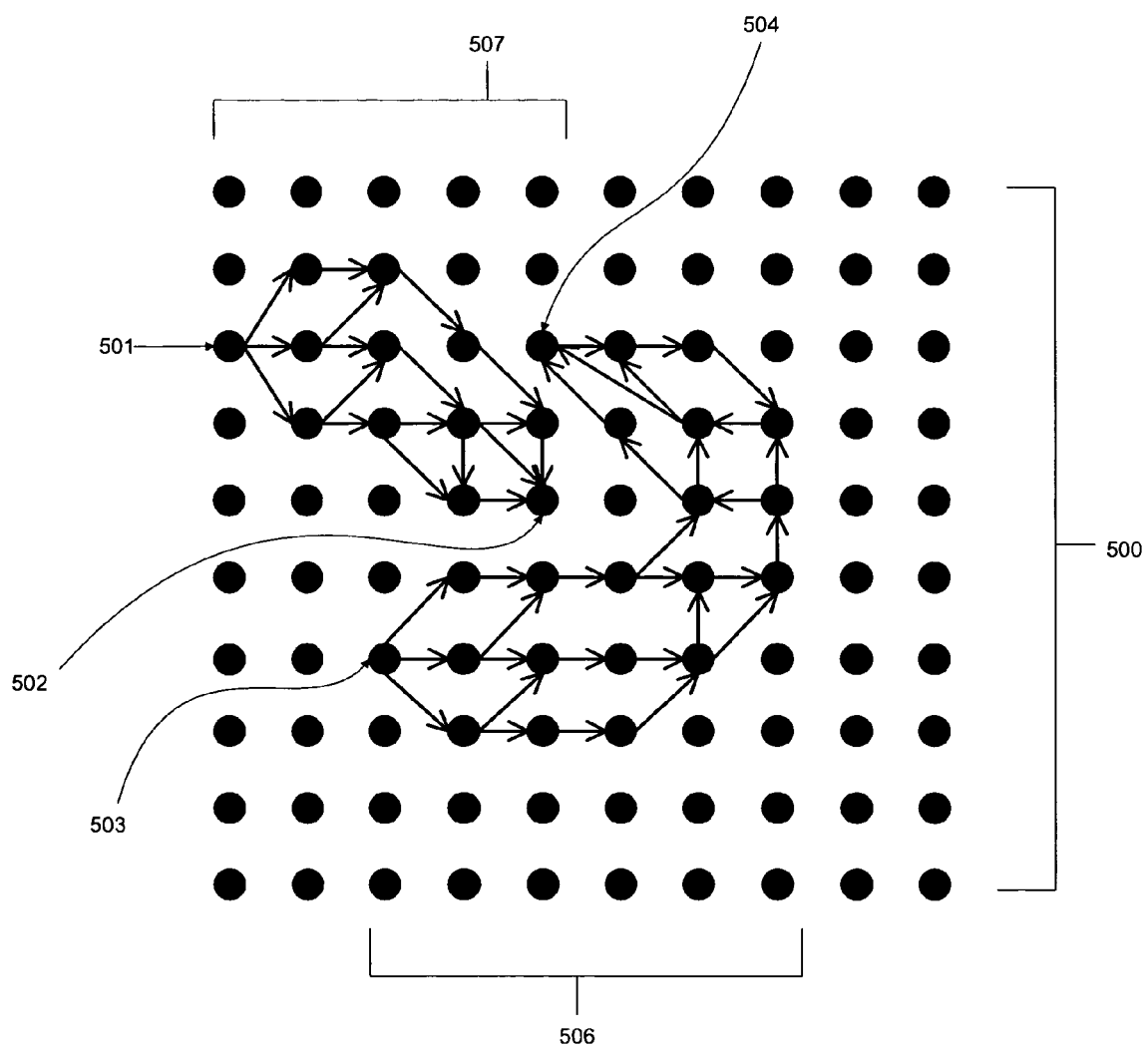
FIG. 5 depicts an array of transceiver/repeaters according to the present invention, and the multiple guided paths that two communications take through the array.

The apparatus shown in FIG. 7 may be used to simultaneously retransmit different sets of information pulses after applying different sets of delay and summing criteria to these different pulse sets. This is illustrated in FIG. 4A (subject to the limitation previously discussed that different delays cannot be applied to different time-coincident frequency components without augmenting the apparatus shown). To demonstrate how multiple retransmission delays may be accomplished on the same channel, consider three parallel receiver/FIR-filter sets ending in summing junctions 401, 402, and 403, respectively, where the outputs of summing junctions 401, 402, and 403 are further summed at summing junction 404. This combined apparatus 405 is equivalent to a single summed DIF 406, as shown in FIG. 4B, feeding a single FIR filter where the set of summing coefficients 407 applied to the outputs of shift register 410 is simply the sum of the coefficients that would have been applied to the outputs of the three parallel shift registers 412, 413, and 414 in the parallel FIR filters, and the final summing junction 409 of the combined FIR filter is simply the combination of summing junctions 401, 402, 403, and 404.

Figure 3:
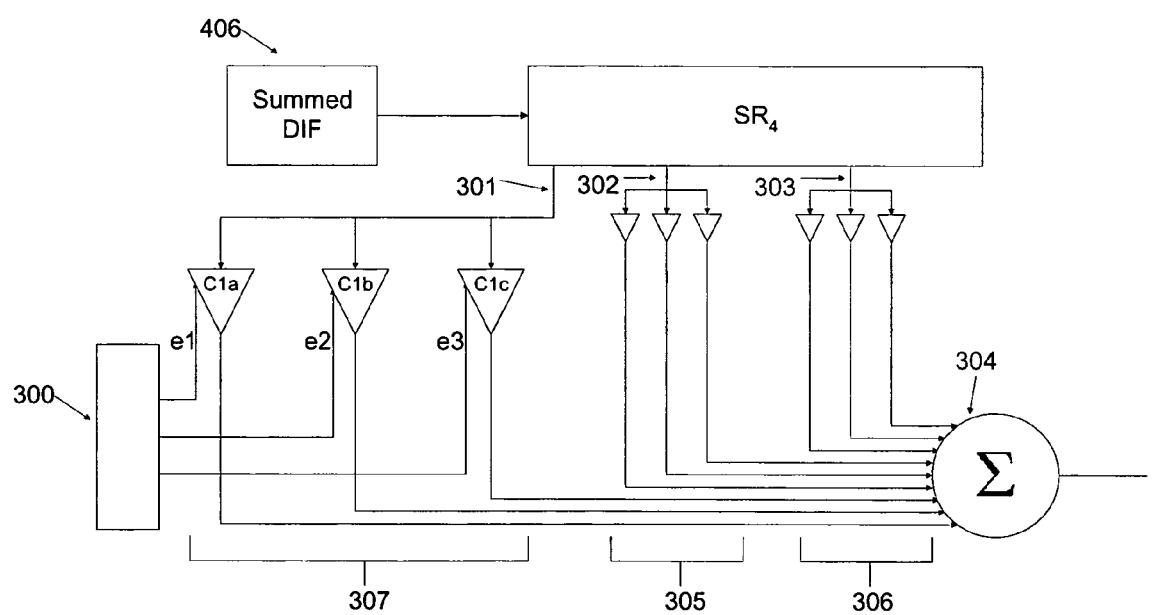
FIG. 3 illustrates the summed Digital IF and rake filter in accordance with the preferred embodiment of the present invention which also incorporates time-division multiplexing.

In the preferred embodiment of the present invention, signals intended to be routed differently through transmitter array 500 may be time-multiplexed on a single channel, and the coefficients 408 of the combined FIR filter 411 may be cycled in time such that the routing through the array changes cyclically, and synchronously with the period of the time multiplexing. This is illustrated in FIG. 3. As shown, selector circuit 300 repetitively and sequentially provides enable signals e1, e2, and e3 (such that no two of e1, e2, and e3 are ever time-coincident). Enable signals e1, e2, and e3 are used to sequentially apply summing coefficients c1$a$, c1$b$, and c1$c$ to output 301 of shift register SR4. Similar sets of time-cycled summing coefficients are applied to shift register outputs 302 and 303. Summing junction 304 is equivalent to summing junction 409. An equivalent way to implement time-cycles coefficient sets 305, 306, and 307 would be to use a cyclically accessed coefficient memory to cyclically load different coefficient sets 407 in FIG. 4.

Although FIG. 6 depicts the frequency spectrum of baseband rectangular information pulse and an amplitude-modulated information pulse, it will be understood by one skilled in the art that the present invention may be adapted for use with continuous (non-pulse) information signals, and any variety of modulation techniques, including but not limited to AM, FM, and Spread-Spectrum techniques. In the preferred embodiment, the information transmitted by multiple repeaters to a given destination transceiver is modulated at each repeater in such a way that the multiple received signals do not cancel at the receive antenna of the destination transceiver. This may, for instance, be insured in the case of multiple received pulse-amplitude-modulated pulses on a single carrier by insuring that the pulses transmitted from the repeaters do not arrive coincident in time. Alternately, freedom from destructive interference at the receive antenna may also be assured by insuring (in pulse or continuous information transmission) that the information signals received simultaneously at a given transceiver are on different, statistically or absolutely non-overlapping frequency bands.

The foregoing discussion should be understood as illustrative and should not be considered to be limiting in any sense. While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method of routing a wireless signal between two points, said method comprising the steps of:
    transmitting a wireless signal from an originating transmitter;
    receiving said wireless signal at a first set of repeating transceivers;
    in each said repeating transceiver, delaying said wireless signal by at least one predetermined delay and re-transmitting said wireless signal;
    such pre-determined delays in such transceivers being calculated to cause a desired alignment in time of arrival of such re-transmitted wireless signals at a destination receiver;
    receiving said re-transmitted wireless signals at said destination receiver;
    demodulating said re-transmitted wireless signals separately within said destination receiver to produce a set of demodulated signals; and
    summing said set of demodulated signals in a time-correlated manner which produces a summed demodulated signal which has a higher signal-to-noise ratio than the signal-to-noise ratio of any of said demodulated signals.

2. The method of claim 1, wherein the signal received at each said repeating transceiver is mixed to an intermediate frequency before said re-transmitting.

3. The method of claim 1, wherein the signal received at each said repeating transceiver is digitized before said re-transmitting.

4. The method of claim 1, wherein the signal received at each said repeating transceiver is processed through an FIR filter before said re-transmitting.

5. The method of claim 1, wherein the signal received at each said repeating transceiver is converted to an analog signal before said re-transmitting.

6. The method of claim 1, wherein the signal received at each said repeating transceiver is up-shifted in frequency before said re-transmitting.

7. The method of claim 1, wherein said predetermined delay is programmable.

8. A transceiver for use in a system for dynamically routing wireless signals, said transceiver comprising:
means for receiving a plurality of wireless signals;
modulating means for modulating said wireless signals to produce a set of modulated signals, said modulating means coupled to said receiving means;
means for digitizing said modulated signals into a plurality of digital signals, said digitizing means coupled to said modulating means;
summing means for aligning in time and summing said plurality of digital signals into a single digital sum signal with a signal-to-noise ratio higher than any of said digital signals.

9. The transceiver of claim 8, further comprising:
means for delaying said digital sum signal by a dynamically adjustable delay dependent on the intended routing of such signal, said delaying means coupled to said summing means;
digital-to-analog converting means for converting said digital sum signal to an analog sum signal; and
means for transmitting said analog summed signal.

10. The transceiver of claim 8, wherein said set of wireless signals are received at separate times on a single carrier frequency.

11. The transceiver of claim 8, wherein said set of wireless signals are received on a plurality of carrier frequencies.

12. A method of routing a wireless signal between two points, said method comprising the steps of:
transmitting a wireless signal as a plurality of wireless signals;
receiving said plurality of wireless signals at a repeating transceiver as a received plurality of wireless signals;
in said repeating transceiver, delaying each of said plurality of wireless signals by a separately predetermined delay to produce a set of delayed wireless signals;
combining said delayed wireless signals into a reconstituted wireless signal; and
re-transmitting said reconstituted wireless signal.

13. The method of claim 12, wherein each of said received plurality of wireless signals is mixed to an intermediate frequency before being delayed by said separately predetermined delay.

14. The method of claim 12, wherein each wireless signal received at each said repeating transceiver is digitized before said re-transmitting.

15. The method of claim 12, wherein each wireless signal received at each said repeating transceiver is processed through an FIR filter before said re-transmitting.

16. The method of claim 12, wherein each wireless signal received at each said repeating transceiver is converted to an analog signal before said re-transmitting.

17. The method of claim 12, wherein said reconstituted wireless signal at each said repeating transceiver is up-shifted in frequency before said re-transmitting.

18. The method of claim 12, wherein each of said separately predetermined delays is programmable.

* * * * *